Patented June 12, 1928.

1,673,679

UNITED STATES PATENT OFFICE.

HAROLD V. HUBER, OF MOUNT LEBANON, AND THOMAS M. FELTON, OF DORMONT, PENNSYLVANIA, ASSIGNORS TO THE VITRO MANUFACTURING COMPANY, OF PITTSBURGH, PENNSYLVANIA, A CORPORATION OF PENNSYLVANIA.

COLOR COMPOSITION FOR VITREOUS ENAMEL.

No Drawing. Application filed July 2, 1926. Serial No. 120,255.

This invention relates to a coloring composition for glass, porcelain, earthenware and other substances, in which it may be incorporated or to which it may be applied as a constituent of glazes, fluxes, enamels or the like.

An object of this invention is to provide a coloring composition which will remain free from discoloring compounds upon fusing.

Another object is to provide a vitrifiable coloring composition, which may applied readily and with much less heat and at a lower temperature than is required by compositions containing the same coloring ingredient.

Other objects will hereinafter appear and be pointed out.

The invention will be better understood from a description of one practical embodiment thereof.

Glasses, glazes, fluxes and enamels are commonly composed of modified silicates, borates or boro-silicates. These compositions are of high melting point and various bases have been added to diminsh the melting point and also to vary the coefficient of the expansion of the composition to cause it to conform to that of the material on which it is used.

Among the bases which are suitable for this purpose are the oxides of lead, which produce compositions having many desirable characteristics. It is also common to incorporate into such a composition various coloring pigments to produce decorative effect, being commonly oxides or salts of metals which, after the glaze is fused, produce the desired color.

Such a substance which may be used as a pigment is cadmium sulphide, either alone or in the presence of selenium. Cadmium sulphide alone imparts a yellow color to the composition and the reaction product of cadmium sulphide and selenium imparts a red color thereto.

However, the use of cadmium sulphide has been attended with considerable difficulty in practice as this material reacts with the lead compound and produces a black or discoloring compound, probably a sulphide of lead.

It has been discovered that such undesirable reaction can be prevented by adding to the composition a salt or oxide of some base, such as the metal that is combined with the sulphide radical, and which will dissolve appreciably in the composition when heated. This may combine with the other ingredients to form a borate, silicate or borosilicate.

For instance, in the composition as above described, using cadmium sulphide as a pigment, if cadmium oxide be added thereto, the formation of the discoloring lead sulphide is prevented. Selenium may be used in such proportion as will produce the desired coloring without affecting the manner in which the composition reacts. As an example of a composition embodying our invention, the following is given:

The flux consists of

| | Pounds |
|---|---|
| Red lead | 24 |
| Boric acid | 7 |
| Cadmium oxide | 2 |

To this cadmium sulphide or a cadmium sulphide-selenium composition is added in the proportion of one part of coloring composition to five parts of flux.

One composition which we find gives particularly desirable results consists of cadmium sulphide 16.7%, lead borate 76%, selenium 1.7% and cadmium oxide 5.6% by weight.

Such a composition may be applied for example to porcelain and thereafter subjected to a temperature of about 1150 degrees Fahrenheit, as a result of which the color characteristic of the cadmium sulphide and selenium ingredients is produced on the porcelain.

Having thus described our invention particularly as applied to the use of cadmium sulphide, it will be obvious that the principle may be applied to other sulphides or salts which produce discoloring compounds, and we therefore do not limit ourselves to the precise composition herein disclosed, but claim as our invention all equivalents coming within the scope of the subjoined claims.

What is claimed is:

1. A vitrifiable coloring composition including a coloring sulphide, a compound of lead, and another compound having the same base as the sulphide which prevents the formation of a discoloring compound.

2. A vitrified article characterized by the presence of a coloring metallic sulphide, a lead compound and absence of a discoloring lead compound.

3. A vitrifiable coloring composition containing cadmium sulphide, lead borate, and cadmium oxide in such proportions as to prevent noticeable formation of a discoloring lead compound.

4. A vitrifiable coloring composition containing cadmium sulphide, a lead compound, and a sufficient quantity of some other cadmium salt to prevent formation of a discoloring lead compound.

5. A vitrifiable composition containing cadmium sulphide, selenium, a lead compound and another cadmium compound.

6. A vitrifiable coloring composition containing cadmium sulphide, cadmium oxide, selenium, and a lead compound, the proportions being such that no discoloring compound is formed upon fusing.

7. A coloring composition comprising, by weight, approximately 16.7% cadmium sulphide, 76% lead borate, 1.7% selenium, and 5.6% cadmium oxide.

8. A vitrifiable coloring composition containing lead borate, cadmium sulphide, and cadmium oxide in substantially the proportions 14 to 3 to 1 by weight, respectively.

In testimony whereof we hereunto affix our signatures this 26th day of June, 1926.

HAROLD V. HUBER.
THOMAS M. FELTON.